United States Patent
Kwant et al.

(10) Patent No.: US 11,410,074 B2
(45) Date of Patent: Aug. 9, 2022

(54) METHOD, APPARATUS, AND SYSTEM FOR PROVIDING A LOCATION-AWARE EVALUATION OF A MACHINE LEARNING MODEL

(71) Applicant: HERE GLOBAL B.V., Eindhoven (NL)

(72) Inventors: Richard Kwant, Oakland, CA (US);
Anish Mittal, Berkeley, CA (US);
David Lawlor, Chicago, IL (US);
Zhanwei Chen, Oakland, CA (US);
Himaanshu Gupta, San Francisco, CA (US)

(73) Assignee: HERE Global B.V., Eindhoven (NL)

( * ) Notice: Subject to any disclaimer, the term of this patent is extended or adjusted under 35 U.S.C. 154(b) by 1273 days.

(21) Appl. No.: 15/842,455

(22) Filed: Dec. 14, 2017

(65) Prior Publication Data

US 2019/0188602 A1   Jun. 20, 2019

(51) Int. Cl.
*G06N 20/00* (2019.01)
*G06F 16/29* (2019.01)
*G06F 16/909* (2019.01)

(52) U.S. Cl.
CPC ............. *G06N 20/00* (2019.01); *G06F 16/29* (2019.01); *G06F 16/909* (2019.01)

(58) Field of Classification Search
CPC .. G06K 9/00798; G06K 9/209; G05D 1/0246; G08G 1/167; B60R 2300/804
See application file for complete search history.

(56) References Cited

U.S. PATENT DOCUMENTS

| 9,507,747 B2 | 11/2016 | Lin et al. |
| 2004/0010481 A1 | 1/2004 | Mani et al. |
| 2017/0195892 A1 | 7/2017 | Tonnemacher et al. |

FOREIGN PATENT DOCUMENTS

| CN | 104330089 A | 2/2015 |
| EP | 3101599 A2 | 12/2016 |

OTHER PUBLICATIONS

Doersch, "Geolocation" Research Paper, retrieved on Oct. 6, 2017 from http://www.cs.cmu.edu/~cdoersch/projects/geolocation.html, 1 Page.
Ibrahim et al., "The Assessment of Machine Learning Model Performance for Predicting Alluvial Deposits Distribution", Procedia Computer Science, vol. 36, Nov. 5, 2014, pp. 637-642.
Tang et al., "Improving Image Classification with Location Context", Computer Vision and Pattern Recognition, May 14, 2015, 9 Pages.

*Primary Examiner* — Robert G Bachner
(74) *Attorney, Agent, or Firm* — Ditthavong, Steiner & Mlotkowski

(57) ABSTRACT

An approach is provided for a location-aware evaluation of a machine learning model. The approach, for example, involves designating a geographic area for creating an evaluation dataset for the machine learning model. The approach also involves separating a plurality of observation data records into the evaluation dataset and a training dataset based on a comparison of a respective data collection location of each of the plurality of observation data records to the geographic area. The training dataset is then used to train the machine learning model, and the evaluation dataset is used to evaluate the trained machine learning model.

20 Claims, 9 Drawing Sheets

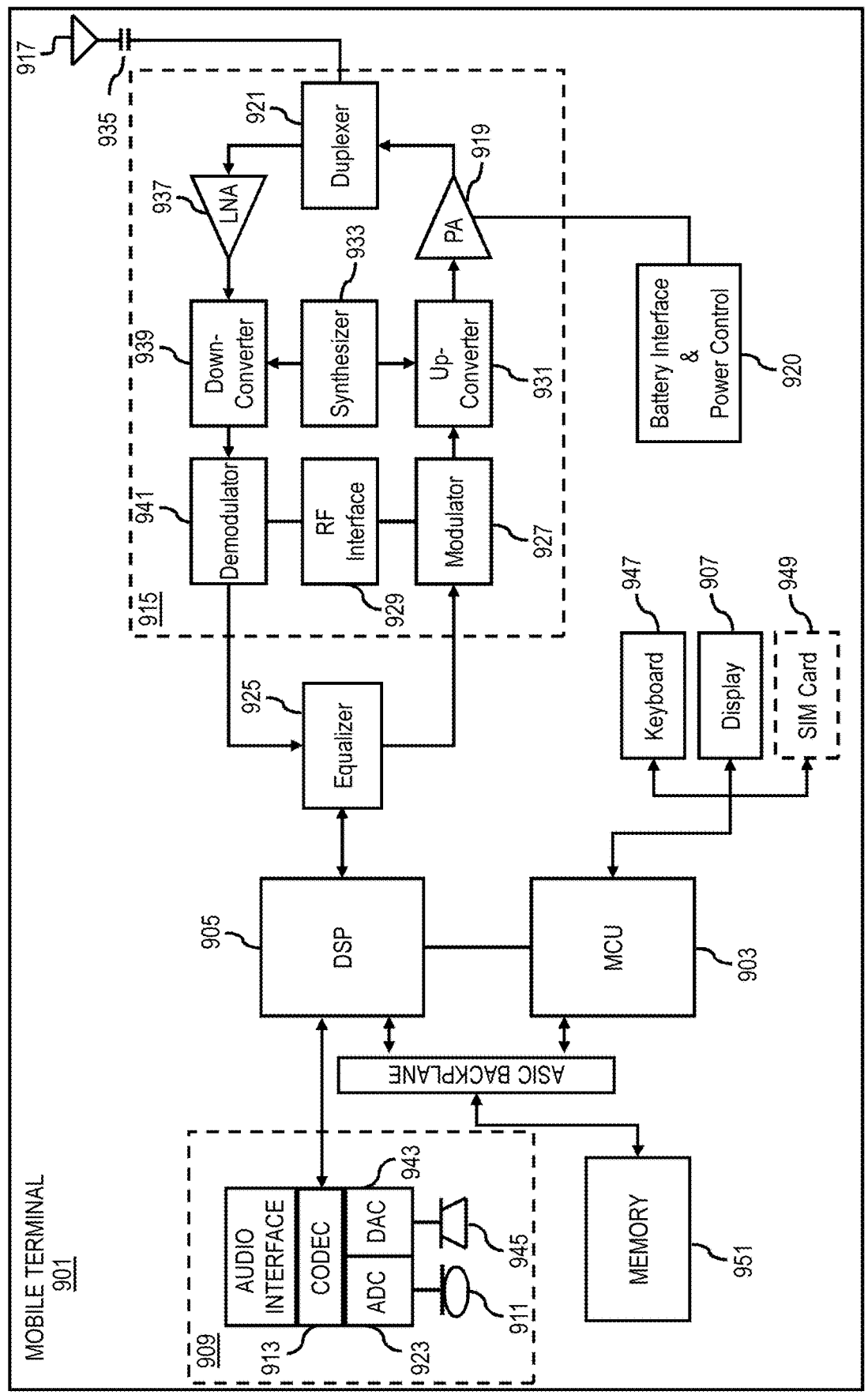

METHOD, APPARATUS, AND SYSTEM FOR PROVIDING A LOCATION-AWARE EVALUATION OF A MACHINE LEARNING MODEL

BACKGROUND

Over the past decades, massive increases in the scale and types of annotated or labeled data have accelerated advances in all areas of machine learning. This has enabled major advances is many areas of science and technology, as complex models of physical phenomena or user behavior, with millions or perhaps billions of parameters, can be fit to datasets of increasing size. In addition to the size of the datasets that are used to train and evaluate machine learning models, the diversity of the types of observations in the training datasets versus evaluation training datasets is also important for creating a robust predictive model. Accordingly, service providers face significant technical challenges to enable efficient automated means for ensuring diversity between training and evaluation datasets.

SOME EXAMPLE EMBODIMENTS

Therefore, there is a need for an approach for providing a location-aware evaluation of a machine learning model to provide for diversity between training and evaluation datasets.

According to one embodiment, a computer-implemented method for providing a location-aware evaluation of a machine learning model comprises designating a geographic area for creating an evaluation dataset for the machine learning model. The method also comprises separating, by a processor, a plurality of observation data records into the evaluation dataset and a training dataset based on a comparison of a respective data collection location of each of the plurality of observation data records to the geographic area. In one embodiment, the training dataset is used to train the machine learning model, and the evaluation dataset is used to evaluate the trained machine learning model.

According to another embodiment, an apparatus for providing a location-aware evaluation of a machine learning model comprises at least one processor, and at least one memory including computer program code for one or more computer programs, the at least one memory and the computer program code configured to, with the at least one processor, cause, at least in part, the apparatus to designate a geographic area for creating an evaluation dataset for the machine learning model. The apparatus is also caused to separate a plurality of observation data records into the evaluation dataset and a training dataset based on a comparison of a respective data collection location of each of the plurality of observation data records to the geographic area. In one embodiment, the training dataset is used to train the machine learning model, and the evaluation dataset is used to evaluate the trained machine learning model.

According to another embodiment, a non-transitory computer-readable storage medium for providing a location-aware evaluation of a machine learning model carries one or more sequences of one or more instructions which, when executed by one or more processors, cause, at least in part, an apparatus to designate a geographic area for creating an evaluation dataset for the machine learning model. The apparatus is also caused to separate a plurality of observation data records into the evaluation dataset and a training dataset based on a comparison of a respective data collection location of each of the plurality of observation data records to the geographic area. In one embodiment, the training dataset is used to train the machine learning model, and the evaluation dataset is used to evaluate the trained machine learning model.

According to another embodiment, an apparatus for using one or more skip areas to label, train, and/or evaluate a machine learning model comprises means for designating a geographic area for creating an evaluation dataset for the machine learning model. The apparatus also comprises means for separating a plurality of observation data records into the evaluation dataset and a training dataset based on a comparison of a respective data collection location of each of the plurality of observation data records to the geographic area. In one embodiment, the training dataset is used to train the machine learning model, and the evaluation dataset is used to evaluate the trained machine learning model.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 9 is a diagram of a mobile terminal (e.g., handset) that can be used to implement an embodiment of the invention.

DESCRIPTION OF SOME EMBODIMENTS

Examples of a method, apparatus, and computer program for providing a location-aware evaluation of a machine learning model are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
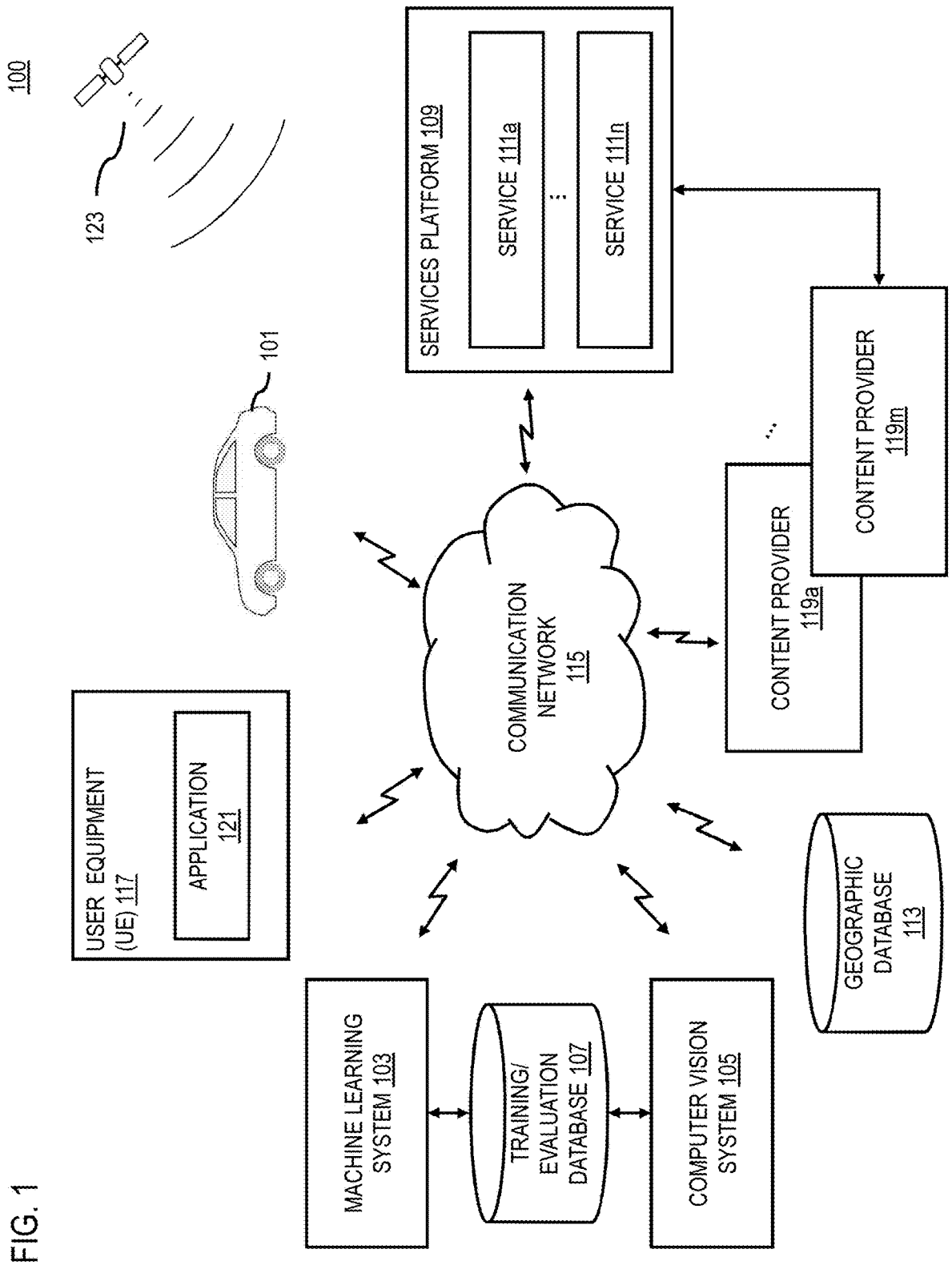
FIG. 1 is a diagram of a system capable of providing a location-aware evaluation of a machine learning model, according to one embodiment.

FIG. 1 is a diagram of a system capable of providing a location-aware evaluation of a machine learning model, according to one embodiment. Machine learning models have enabled a variety of sophisticated services and applications. For example, machine learning-based computer vision systems have enabled a variety of object recognition based services and applications. For example, autonomous driving has quickly become an area of intense interest, with recent advances in machine learning, computer vision and computing power enabling real-time mapping and sensing of a vehicle's environment. Such an understanding of the environment enables autonomous, semi-autonomous, or highly assisted driving in a vehicle (e.g., a vehicle 101) in at least two distinct ways.

First, real-time sensing of the environment provides information about potential obstacles, the behavior of others on the road, and safe, drivable areas. An understanding of where other cars are and what they might do is critical for a vehicle 101 to safely plan a route. Moreover, vehicles 101 generally must avoid both static (lamp posts, e.g.) and dynamic (cats, deer, e.g.) obstacles, and these obstacles may change or appear in real-time. More fundamentally, vehicles 101 can use a semantic understanding of what areas around them are navigable and safe for driving. Even in a situation where the world is completely mapped in high resolution, exceptions will occur in which a vehicle 101 might need to drive off the road to avoid a collision, or where a road's geometry or other map attributes like direction of travel have changed. In this case, detailed mapping may be unavailable, and the vehicle 101 has to navigate using real-time sensing of road features or obstacles using a computer vision system (e.g., a machine learning system 103 in combination with a computer vision system 105).

A second application of vision techniques in autonomous driving is localization of the vehicle 101 with respect to a map of reference landmarks. Understanding one's location on a map enables planning of a route, both on fine and coarse scales. On a coarse scale, navigation maps allow vehicles 101 to know what roads to use to reach a particular destination. However, on a finer scale, maps allow vehicles 101 to know what lanes to be in and when to make lane changes. Knowing this information is important for planning an efficient and safe route, for in complicated driving situations maneuvers need to be executed in a timely fashion, and sometimes before they are visually obvious. In addition, localization with respect to a map enables the incorporation of other real-time information into route planning. Such information could include traffic, areas with unsafe driving conditions (ice, fog, potholes, e.g.), and temporary road changes like construction.

In one embodiment, the machine learning system 103 in combination with the computer vision system 105 enables autonomous driving (as described above) and other similar object/image recognition based services through a machine learning framework. Therefore, the labeled data used for training and evaluation in this embodiment can include location-tagged road images depicted features that can be predicted by the machine learning system 103. It is noted that although the various embodiments described herein are discussed herein with respect to the machine learning system 103 and the computer vision system 105 for autonomous driving applications, it is contemplated that the various embodiments are applicable to any type of machine learning application, service, or function that uses location-tagged data (e.g., recorded observations that are associated with a geographic location such as image data tagged with the geographic coordinates at which the image was captured) in its training and evaluation datasets.

By way of example, a set of labeled data used for evaluating the quality of a trained machine learning model is referred to as an evaluation dataset. The set of labeled data used for training the machine learning is referred to as the training dataset. In other words, at the core of the machine learning framework described in the various embodiments is a set of location-tagged data with feature labels that have been annotated to train and evaluate a machine learning model to make feature predictions. For example, human-annotated feature labels can serve as ground truth (i.e., an evaluation dataset) for measuring/evaluating the quality of the feature detection and can be a key indicator to judge the quality of the trained machine learning model.

Generally, evaluation sets are very important for measuring the performance of a trained machine learning algorithm and finding the generalizability and accuracy of the model. However, if there is too much similarity or overlap between the training dataset and the evaluation dataset, the performance estimation of the trained machined learning model can be potentially overly optimistic since the machine learning model has a better chance of performing well on an evaluation dataset that has similar content to the training dataset on which the model was trained. Therefore, achieving diversity between the training dataset and the evaluation dataset can pose significant technical challenges.

To address these problems, the system 100 of FIG. 1 introduces a capability to provide location-aware diversification between a training dataset and evaluation dataset of a machine learning model. More specifically, the machine learning system 103 of the system 100 provides a systematic way to create evaluation datasets that do not overlap geographically with the training dataset. In one embodiment, the system 100 can specify specific geographic areas from where the system 100 will sample either the evaluation dataset or the training dataset. For example, in one embodiment, the system 100 can designated a geographic area from which observation data records (e.g., location-tagged images) can be collected for inclusion in the evaluation dataset. In this way, the evaluation dataset can be drawn exclusively from the designated geographic area while training data for the same machine learning model can be drawn from other geographic areas that do not overlap with the designated geographic area. In addition or alternatively, in one embodiment, the system 100 can designate a geographic area from which observation data records can be collected for the training dataset. Then, the evaluation dataset can be collected from other non-overlapping geographic areas.

In other words, the system 100 can designate respective geographic areas for collecting the evaluation dataset, the training dataset, or a combination thereof so that that the data included in the training dataset do not overlap geographically with the data included in the evaluation data. This non-overlap of the geographic areas makes the resulting evaluation and training datasets location-aware. This location-awareness, for instance, can increase diversity between the training datasets and evaluation datasets because data collected from non-overlapping areas are more likely to exhibit more differences. Location-diversity also can be especially important to consider when service providers (e.g., map making companies) deploy a fleet of data capture vehicles 101 to collect data for training and evaluating machine learning models, and the same geographic area could be captured several times by the fleet. Randomly sampling the captured data to obtain training and evaluation datasets would lead to content overlap. The embodiments of location-aware data collection described herein can avoid this content overlap. Also, since data capture is an ongoing process, it is important to make sure that any subsequent data that gets added to the training set does not overlap with the evaluation set and vice versa.

In one embodiment, the system 100 can automatically determine which geographic areas should be designated for collecting training data or for collecting evaluation data. For example, such bipartition of the geographic areas can be based on various attributes of road network and/or the geographic areas. These attributes can include, but are not limited to: (1) road geometry; (2) terrain; (3) historical weather conditions; (4) presence or absence of features such as tunnels, bridges, etc.; etc. The system 100 can select the separate training and evaluation geographic areas so that they are likely to produce data that are representative of various scenarios or combinations of attributes while still being disjointed from one another.

In yet another embodiment, the system 100 can automatically determine the percentage of the available geographic areas to devote to training versus evaluation to achieve, for instance, a target mix of training data and evaluation data. For example, a general target for a mix of training versus evaluation can be 75% training data and 25% evaluation data (or any other mix designated by a system administrator). Based on the specified target mix, the system 100 can determine which areas to designate for collecting training data and which areas to designate for collecting evaluation data so that the resulting data set reflects the desired mix. As with the case above, the mix selection can be based on various attributes of the road network or geographic areas to ensure that various attribute combinations or scenarios are represented.

Figure 2:
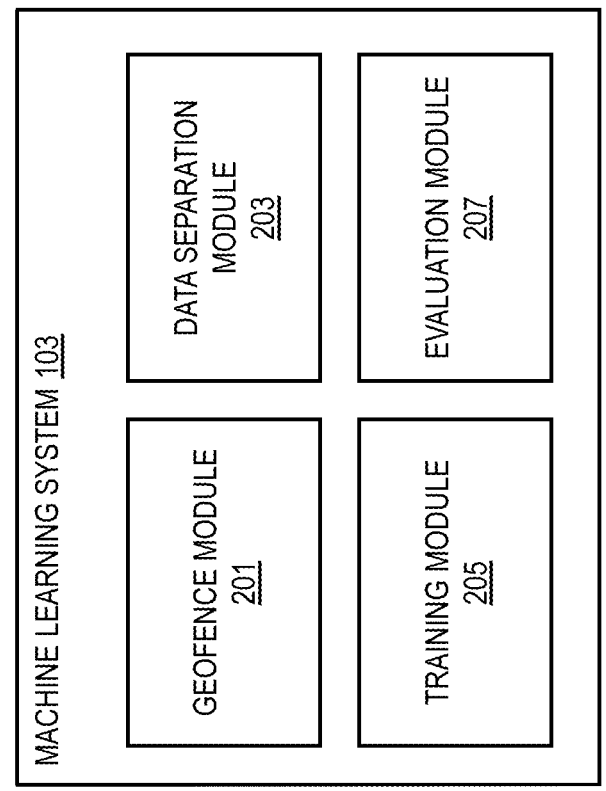
FIG. 2 is a diagram of components of a machine learning system, according to one embodiment.

FIG. 2 is a diagram of components of a machine learning system, according to one embodiment. By way of example, the machine learning system 103 includes one or more components for providing a location-aware evaluation of a machine learning model according to the various embodiments described herein. It is contemplated that the functions of these components may be combined or performed by other components of equivalent functionality. In this embodiment, the machine learning system 103 includes a geofence module 201, a data separation module 203, a training module 205, and an evaluation module 207. The above presented modules and components of the machine learning system 103 can be implemented in hardware, firmware, software, or a combination thereof. Though depicted as a separate entity in FIG. 1, it is contemplated that the machine learning system 103 may be implemented as a module of any of the components of the system 100 (e.g., a component of computer vision system 105, services platform 109, services 111a-111n (also collectively referred to as services 111), etc.). In another embodiment, one or more of the modules 201-207 may be implemented as a cloud based service, local service, native application, or combination thereof. The functions of the machine learning system 103 and the modules 201-207 are discussed with respect to FIGS. 3-6 below.

As discussed above, one application of machine-learning-based vision techniques that can be used with the various embodiments described herein is vehicle localization with respect to known reference features (e.g., localization of the vehicle 101 to specific lanes of a road segment). Traditionally, most vehicle navigation systems have accomplished this localization using GPS, which generally provides a real-time location with a 95% confidence interval of 7.8 meters. However, in complicated urban environments, reflection of GPS signals can further increase this error, such that one's location may be off by as much as 30 meters. Given that the width of many lanes is 3-4 meters, this accuracy is not sufficient to properly localize a vehicle 101 (e.g., an autonomous vehicle) so that it can make safe route planning decisions. Other sensors, such as inertial measurement units (IMUs) can increase the accuracy of localization by taking into account vehicle movement, but these sensors tend to drift and still do not provide sufficient accuracy for localization.

In general, a localization accuracy of around 10 cm is needed for safe driving in many areas. One way to achieve this level of accuracy is to use visual odometry, in which features are detected from imagery using feature prediction models (i.e., a machine learning classifier). These features can then be matched to a database of features to determine one's location. By way of example, traditional feature-based localization that both detect features and localize against them generally rely on low-level features. However, low-level features typically used in these algorithms (e.g., Scale-Invariant Feature Transform (SIFT) or Oriented FAST and rotated BRIEF (ORB)) tend to be brittle and not persist in different environmental and lighting conditions. As a result, they often cannot be used to localize a vehicle on different days in different weather conditions. Aside from reproducibility, the ability to detect and store higher level features of different types (e.g., lane features such as lane markings, lane lines, etc.) can provide better and more accurate localization.

In response to these issues, the system 100 of FIG. 1 (e.g., including the machine learning system 103 and/or computer vision system 105) focuses on detecting high level features that have semantic meaning for human beings. One such feature that is important to autonomous driving is the detection of lane features (e.g., lane markings, lane lines, Botts' dots, reflectors, etc.) and corresponding lane models. Lane-level information is important for self-driving applications because it defines the grammar of driving. Without knowledge of lane markings, it can difficult or impossible to determine where a vehicle 101 should drive, can drive, and what maneuvers are possible. As a result, the ability to detect lane-lines in real-time constitutes a fundamental part for the design of an autonomous vehicle 101.

In other words, the success of localization based on features detected from an image can depend on the precise localization of those features within the image and the quality of the technique used to detect the lane features, road objects, and/or other similar features. This success, for instance, can depend greatly on how well trained and evaluated a feature prediction model is, and the quality/diversity of the training and evaluation datasets (e.g., feature-labeled images stored in a training/evaluation database 107). In one embodiment, the observation data records from which the training and evaluation datasets are created include road images captured by vehicles 101 that have been tagged with their respective capture/collection locations as the vehicles 101 travel along a road network. To create a well-trained machine learning or prediction model, the system 100 can use the embodiments described herein to improve the efficiency of the machine learning system 103 with respect to providing location-aware training and evaluation datasets as described with respect to FIG. 3.

Figure 3:
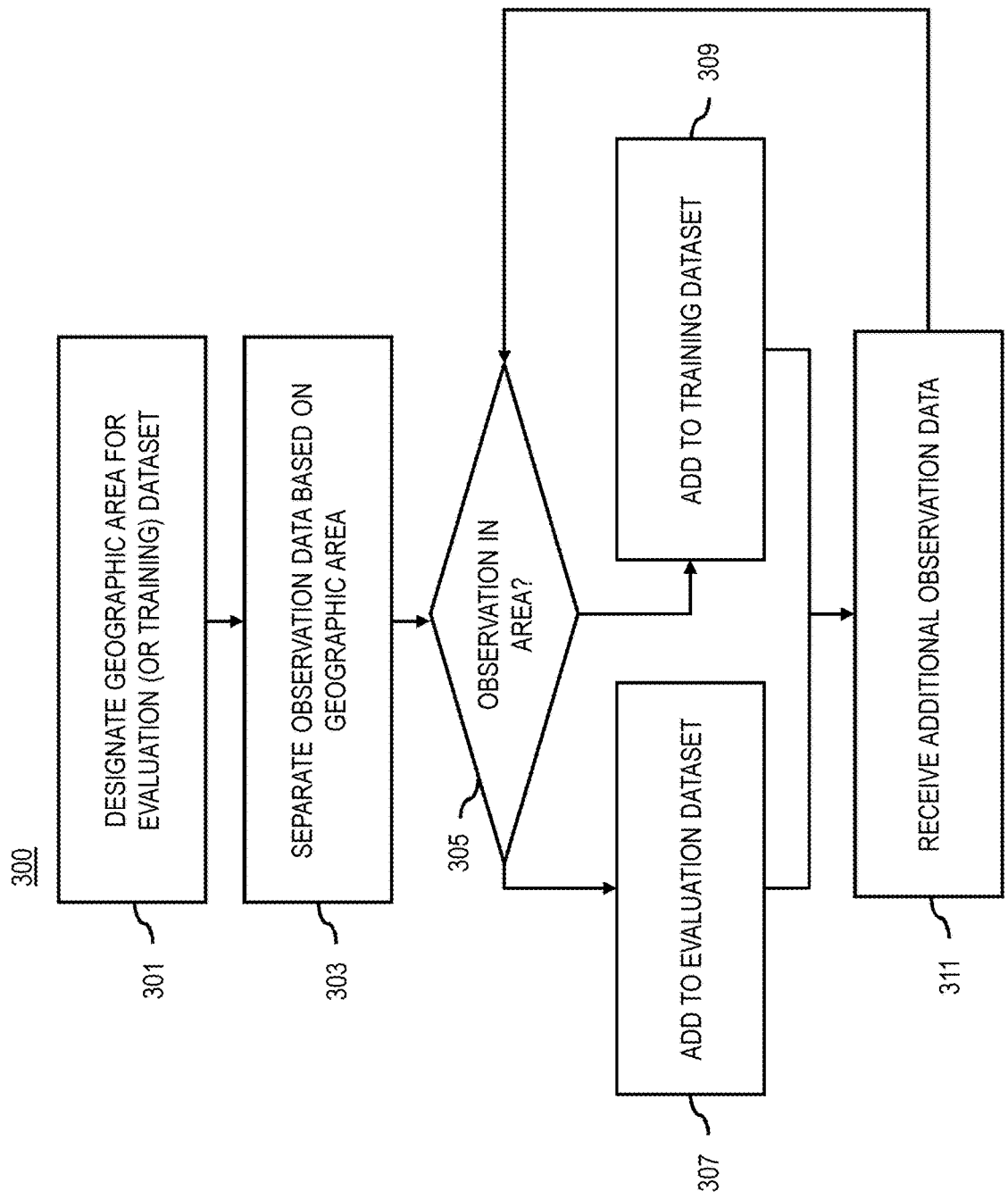
FIG. 3 is a flowchart of a process for providing a location-aware evaluation of a machine learning model, according to one embodiment.
Figure 8:
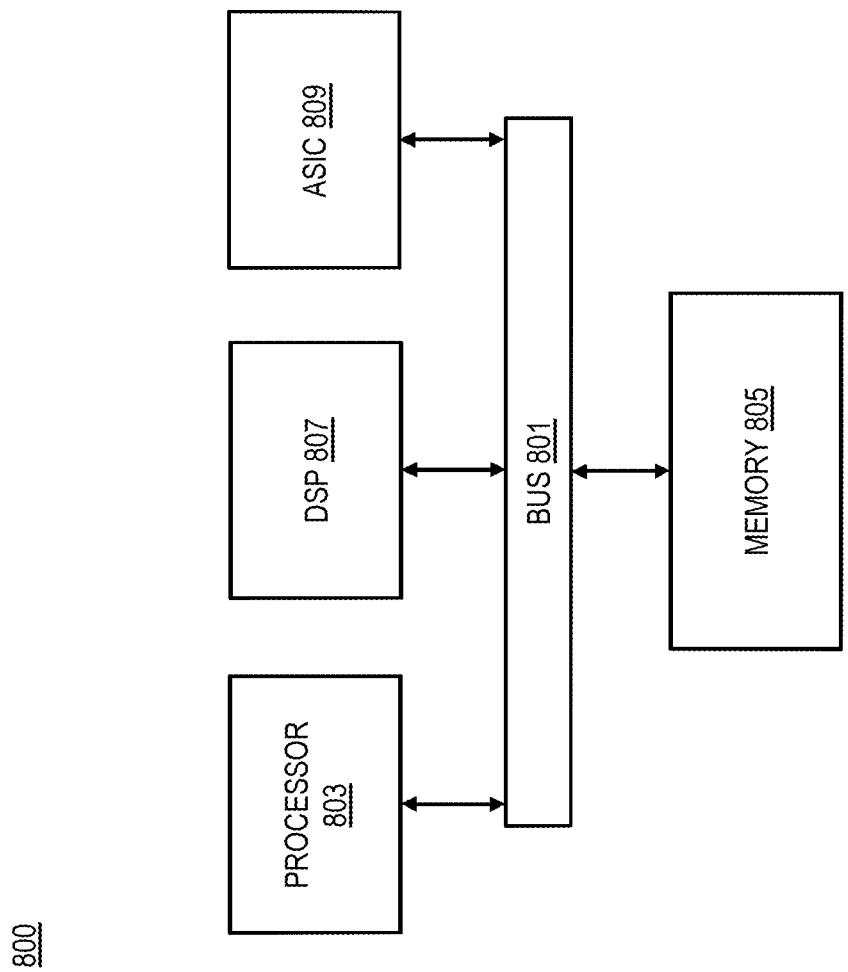
FIG. 8 is a diagram of a chip set that can be used to implement an embodiment of the invention.

FIG. 3 is a flowchart of a process for providing a location-aware evaluation of a machine learning model, according to one embodiment. In various embodiments, the machine learning system 103 and/or any of the modules 201-207 of the machine learning system 103 may perform one or more portions of the process 300 and may be implemented in, for instance, a chip set including a processor and a memory as shown in FIG. 8. As such, the machine learning system 103 and/or the modules 201-207 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In one embodiment, the machine learning system 103 includes or is otherwise associated with a machine learning model to can be used to label images with one or more features (e.g., road markings, signs, and/or other objects that are visible in an image and can be used for visual odometry). Generally, a machine learning model (e.g., a set of equations, rules, decision trees, etc.) manipulates an input feature set to make a prediction about the feature set or the phenomenon/observation that the feature set represents. The machine learning system 103 can use any means known in the art to detect features in input observations. As used herein, an observation can include any image or set of images representing an observed phenomenon from which features can be extracted, and the features can include any property or characteristic of the observed phenomenon.

It is contemplated that the machine learning model and/or the machine learning system 103 can be used to support any service or function. For example, with respect to using the machine learning system 103 for visual odometry (e.g., to support vehicle localization) for autonomous driving or other image-based applications, one technique that has shown significant ability to detect lanes or other objects is the use of convolutional neural networks, recurrent neural networks, and/or other equivalent machine learning classifiers to process images. Neural networks have shown unprecedented ability to recognize objects in images, understand the semantic meaning of images, and segment images according to these semantic categories to predict related features. When such neural networks or other machine learning classifiers predict whether an image depicts or is otherwise associated with certain classification features, they can also compute a confidence or probability that the predicted feature is likely to be true. In an embodiment where the features or road or map related feature, the machine learning system 103 can use the trained machine learning model to generate navigation guidance information.

In one embodiment, as discussed above, the machine learning model uses feature labeled data as ground truth data to automatically "learn" or detect relationships between different input feature sets and then output a predicted feature. The quality of the feature prediction model and the feature predictions that it makes can be highly dependent on the quality and diversity of the observation dataset used to train and evaluate the model. For example, training and evaluation datasets are generally created by human labelers who manually mark feature labels for each data item in the training and evaluation datasets (e.g., the training/evaluation database 107). For example, with respect to a use case of machine learning based object detection in images, the ground data truth data can include a set of images that have been geo-tagged to indicate their capture/collection locations, and also manually marked or annotated with feature labels to indicate examples of the features or objects of interest. A manually marked feature (e.g., lane markings, road signs, etc.), for instance, can be a polygon or polyline representation of the feature that a human labeler has visually detected in the image. For example, the polygon, polyline, and/or other feature indicator can outline or indicate the pixels or areas of the image that the labeler designates as depicting the labeled feature.

In one embodiment, training and evaluation datasets can potentially require thousands or even millions of examples (e.g., individual data item or images) captured over a wide geographic area. Random sampling of the examples for inclusion in the training and evaluation datasets can mask the geographic diversity of the data. Accordingly, to maximize the geographic diversity of the training and evaluation datasets, the geofence module 201 designates a geographic area for creating an evaluation dataset for the machine learning model (step 301). It is noted that although the various embodiments are described with respect to designating geographic areas from where an evaluation dataset is sampled and then the training dataset can be selected from other geographic areas that do not overlap with the area designated for the evaluation dataset, it is contemplated that other embodiments may provide for the opposite designation. For example, in other embodiments, the geofence module 201 can designate geographic areas from which the training dataset are sample, and then the evaluation dataset is sample form other geographic areas that do not overlap with the designated areas. Accordingly, in the embodiments described herein the evaluation dataset and the training dataset can be substituted for each other in the descriptions of the embodiments. In this way, the embodiments can work with either areas designated for the evaluation dataset or areas designated for the training dataset, even though the embodiments are described with respect to designating geographic areas for the evaluation dataset.

Figure 4:
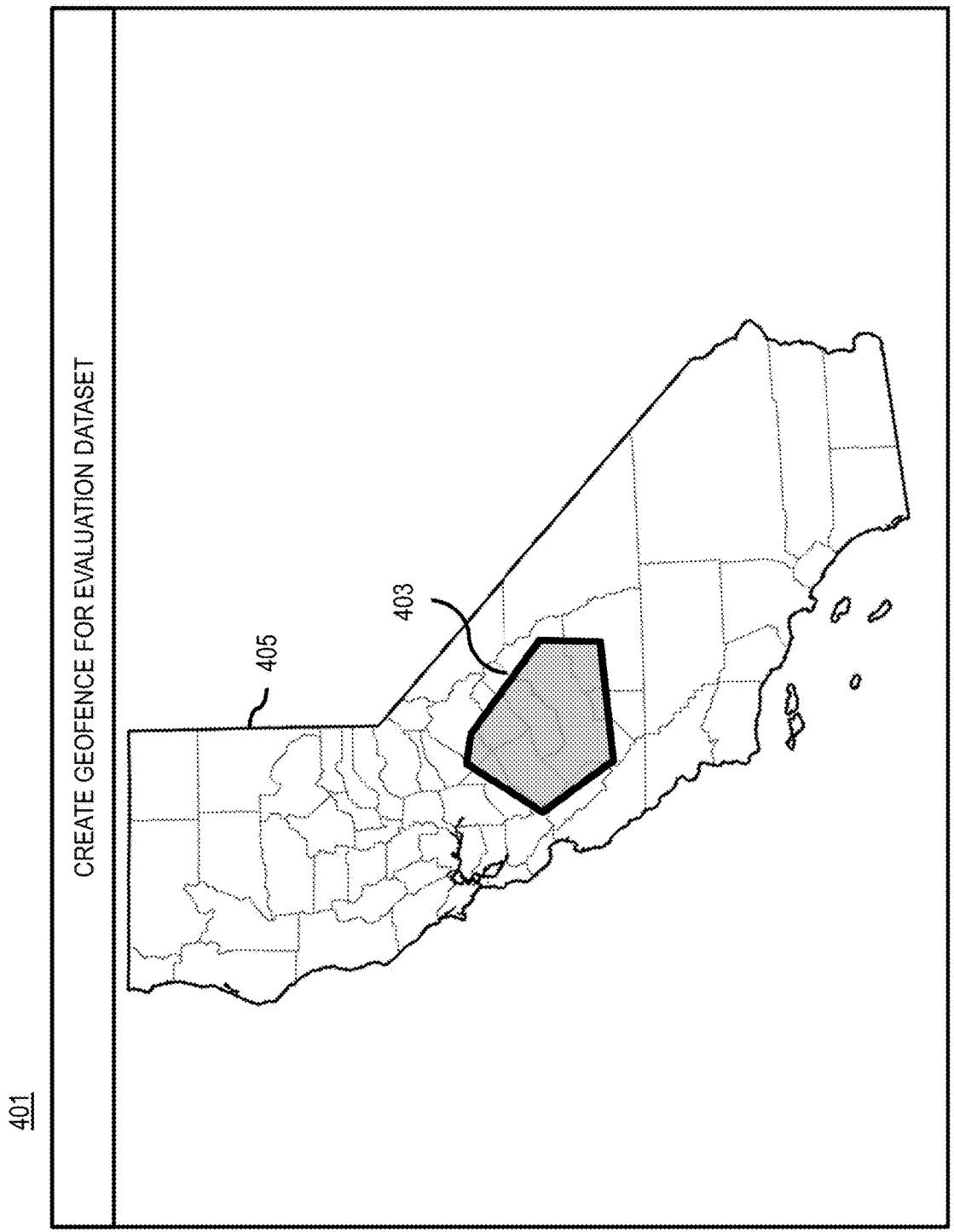
FIG. 4 is a diagram illustrating an example user interface for designating a geographic area as a geofence for creating a location-aware evaluation dataset, according to one embodiment.

In one embodiment, the geographic area is specified as a geofence as shown in FIG. 4 which is a diagram illustrating an example user interface (UI) 401 for creating a geofence for an evaluation dataset, according to one embodiment. Geofences, for instance, are virtual shapes/perimeters that represent a real-world geographic area. In the example of FIG. 4, the geofence module 201 can present the UI 401 for a user to create one or more geofences. As shown, the user has created a geofence 403 by drawing a polygonal boundary or perimeter of the geofence 403 over a map 405. The geographic area falling within the geofence 403 then represents the area from where observations are collected to create the evaluation dataset. Although only one geofence 403 or geographic area is depicted in FIG. 4, it is contemplated that any number of geofences or geographic areas can be designated for sampling observation data records and creating the evaluation dataset. Using the geofencing technique for choosing areas from where evaluation data gets picked from, provides a principled way to separate the training and evaluation data based on geographic diversity or location-awareness to advantageously improve the robustness and generalizability of a machine learning model.

In one embodiment, to find the areas to be geofenced, the geofence module 201 can evaluate different geographic areas based on their respective map attributes like functional class, road elevation, speed category, presence/absence of road features such as tunnels, etc. As previously described, these attributes can be used to automatically designate training and evaluation geographic areas so that various scenarios or combination of attributes can be represented. In addition, the attributes can be used determine the percentages of the geographic areas dedicated to training versus evaluation data to provide a target mix between the two data sets for training and evaluation of the machine learning model. In other words, the geographic areas for creating training and/or evaluation datasets are designated based on one or more map attributes. In one embodiment, the map attributes can be queried from a geographic database 113. Based on the map attributes, the geofence module 201 can select which geographic areas should be designated as training and/or evaluation datasets based on maximizing the diversity for these areas to be representative of different kinds of observation data records (e.g., different kinds of road images). In other words, the geofence module 201 can select the designated geographic area from one or more candidate geographic areas based on a diversity of the one or more map attributes for the respective areas.

Figure 5:
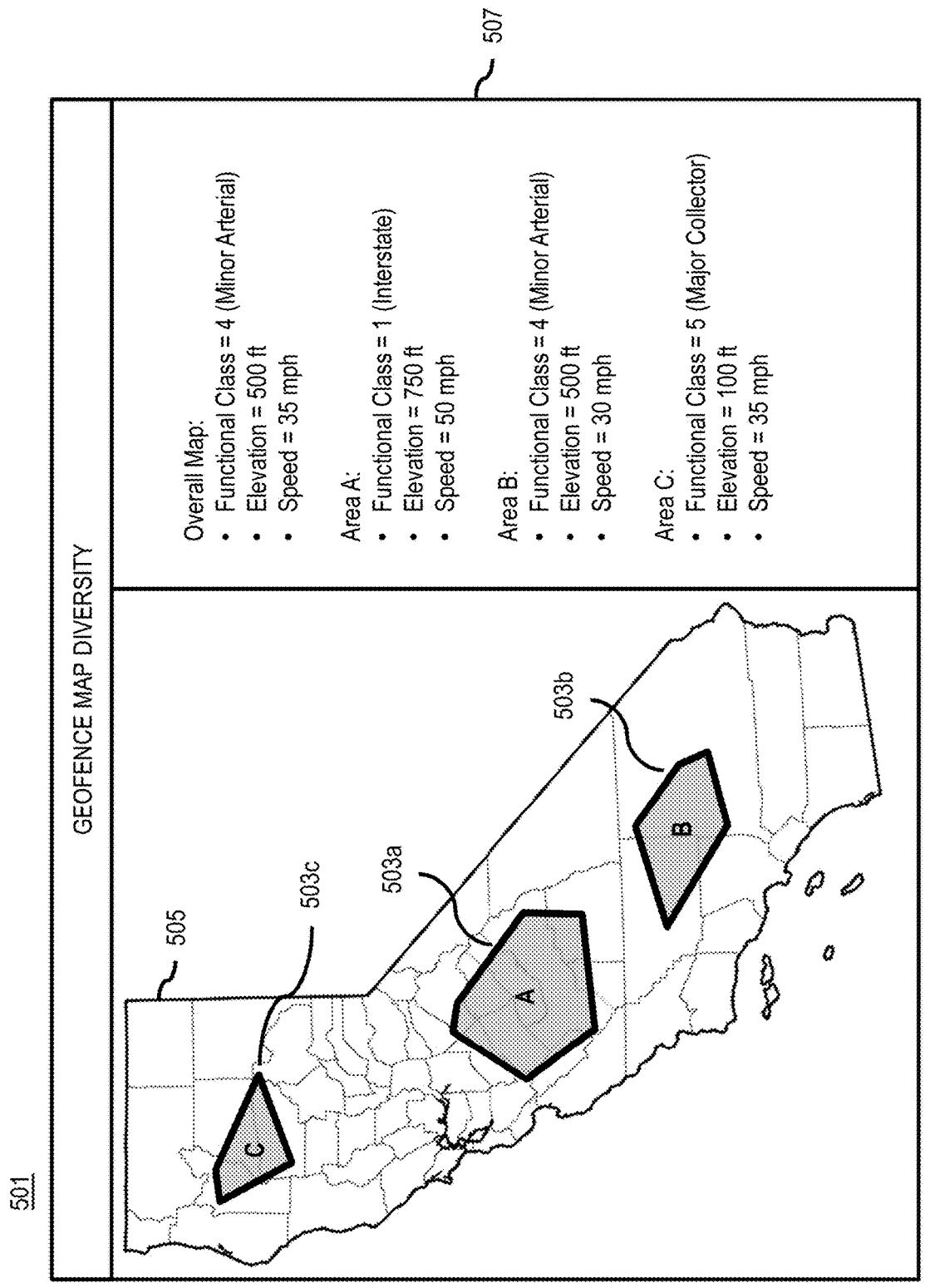
FIG. 5 is a diagram illustrating an example user interface for presenting map attribute diversity for designated geographic areas, according to one embodiment.

FIG. 5 is a diagram illustrating an example user interface for presenting map attribute diversity for designated geographic areas, according to one embodiment. As shown, the geofence module 201 can present a UI 501 in which a user can specify candidate geographic areas such candidate geographic areas 503a-503c respectively corresponding to Area A, Area B, and Area C of the map 505. In addition or alternatively, the geofence module 201 can recommend or otherwise automatically determine the top candidate geographic areas 503a-503c for presentation to the user so that the user need not manually specify the areas. The geofence module 201 can then query the geographic database for various map attributes (e.g., functional class, road elevation, speed or speed category, etc.) for each candidate geographic area 503a-503c. In one embodiment, the geofence module 201 presents the determined map attributes for the candidate geographic areas 503a-503c as well as the map attribute values for the overall map 405. In one embodiment, the geofence module 201 can compute a diversity score (e.g., based on a difference between the map attributes of each candidate geographic area 503a-503c from the overall or average values of the map 405, or based on any other equivalent or known process for quantifying a diversity or difference among the map attribute values). The geofence module 201 can then select the designated geographic area for creating the evaluation dataset from among the candidate geographic areas 503a-503c to maximize the diversity.

In one embodiment, after designating the geographic area or areas, the geofence module 201 interacts with the data separation module 203 to begin processing sampled observation data records to create the evaluation dataset and/or the training datasets. In one use case, the plurality of observation data records is captured by one or more sensors of one or more probe devices (e.g., vehicles 101 traveling over a road network). When the machine learning system 103 is used for image-based vehicle localization, the plurality of observation data records includes one or more location-tagged images captured by probe vehicles 101. In step 303, to create the evaluation dataset, the data separation module 203 separates the observation data records into the evaluation dataset and a training dataset based on a comparison of a respective data collection location of each of the plurality of observation data records to the geographic area.

In one embodiment, the data separation module 203 performs the comparison by determining whether the collection location of a particular observation is in the designated geographic area (e.g., located within the designated geofence). For example, the data separation module 203 adds at least one record of the processes observation data records to the evaluation dataset based on determining that the respective data collection location is within the geographic area (step 307). Conversely, the data separation module 203 adds at least one record of the observation data records to the training dataset based on determining that the respective data collection location is not within the geographic area (step 309). In this way, the data separation module 203 ensures that the training dataset and the evaluation dataset do not overlap geographically. As previously discussed, this non-overlap of the two data sets can increase the diversity between the two datasets.

In one embodiment, the data separation module 203 accommodates the ongoing ingestion of new image data or other observation data by providing a framework for evolving databases. For example, in many cases, creation of the training and evaluation datasets is an ongoing process because new observation data are being collected as probe vehicles 101 continue to travel. The designated geographic areas for creating evaluation datasets through geofencing ensures that any new training data will not overlap geographically with the evaluation dataset, and vice versa. In other words, maintaining a geographical separation between the datasets provides an efficient way to expand the evaluation dataset as new images come online with more diversity (e.g., more diverse weather conditions, drives are done in new parts of geofenced areas, etc.).

Step 311 illustrates an example process for ingestion new observation data. For example, the data separation module 203 receives another observation data record after creating the evaluation dataset, the training dataset, or a combination thereof. The data separation module 203 can then expand the evaluation dataset or the training dataset to include the other observation data record based on a comparison of another data collection location of the other observation data record to the geographic area. For example, if the other collection location is within the designated geographic area, the data separation module 203 expands the evaluation dataset by adding the new observation data record to the evaluation dataset. If the other collection location is not with the designated geographic area, the data separation module 203 expands the training dataset by adding the new observation data record to the training dataset.

After creating the training and evaluation datasets, the training module 205 trains the machine learning model using the training dataset sampled from geographic areas that do not overlap with the designated geographic area for sampling the evaluation dataset. In one embodiment, the training module 205 can incorporate a supervised learning model (e.g., a logistic regression model, RandomForest model, and/or any equivalent model) to train a machine learning model based on the location-aware training data that represents the ground truth data. For example, during training, the training module 205 uses a learner module that feeds feature sets from the training dataset marked into the feature prediction model (e.g., machine learning model) to compute a predicted feature set using an initial set of model parameters.

The learner module then compares the predicted feature set to the ground truth data (e.g., the manually marked feature labels) in the location-aware training dataset for each image used for training. For example, the learner module computes a loss function representing, for instance, an accuracy of the predictions for the initial set of model parameters. In one embodiment, the training module 205 computes a loss function for the training of the machine learning module based on the images or observation data sampled from geographic areas that do not overlap with the designated geographic area for creating the evaluation dataset. In this way, the training module 205 can improve the training of the machine learning model by avoiding overfitting to the evaluation dataset if the evaluation dataset were drawn from the same geographic area as the training dataset. The learner module of the training module 205 then incrementally adjusts the model parameters until the model minimizes the loss function (e.g., achieves a maximum accuracy with respect to the manually marked labels in the non-skip areas of training data). In other words, a "trained" feature prediction model is a classifier with model parameters adjusted to make accurate predictions with respect to the location-aware training dataset or ground truth data.

After training the machine learning model, the evaluation module 207 processes the location-aware evaluation dataset (e.g., sampled from the designated geographic area that does not overlap with areas from which the training dataset is sampled) to determine one or more feature predictions. The evaluation dataset, for instance, is the portion of the ground truth or labeled observation dataset that sampled from the designated geographic area that does not overlap with areas from which the training dataset is sampled, and has been reserved for validating or evaluating the performance of the trained machine learning model. For image-based use cases, the location-aware evaluation dataset includes ground truth feature labels for the corresponding location-tagged images in the evaluation dataset. These validation images can be processed using the trained feature model to determine predicted features. The evaluation module 207 then compares the predicted feature set against the manually labeled feature set (e.g., the ground truth data) for each image of the location-aware evaluation dataset. This comparison, in turn, can be used to estimate the predictive accuracy of the trained machine learning model. In one embodiment, if the evaluated accuracy does not meet a threshold value, the machine learning system 103 can initiate corrective action (e.g., retraining of the machine learning model, collection of additional ground truth data for training and evaluation, modification of model parameters or hyperparameters, etc.).

Returning to FIG. 1, as shown, the system 100 includes the machine learning system 103 for providing a location-aware evaluation of a machine learning model according the various embodiments described herein. In some use cases, the system 100 can include the computer vision system 105 configured to use machine learning to detect objects or features depicted in images. For example, with respect to autonomous, navigation, mapping, and/or other similar applications, the computer vision system 105 can detect road features (e.g., lane lines, signs, etc.) in an input image and generate associated prediction confidence values, according to the various embodiments described herein. In one embodiment, the machine learning system 103 includes a neural network or other machine learning system to make predictions from machine learning models. For example, when the input to the machine learning model are images used for visual odometry, the features of interest can include lane lines detected in the images to support localization of, e.g., a vehicle 101 within the sensed environment. In one embodiment, the neural network of the machine learning system 103 is a traditional convolutional neural network which consists of multiple layers of collections of one or more neurons (which are configured to process a portion of an input image. In one embodiment, the receptive fields of these collections of neurons (e.g., a receptive layer) can be configured to correspond to the area of an input image delineated by a respective a grid cell generated as described above.

In one embodiment, the machine learning system 103 and/or the computer vision system 105 also have connectivity or access to a geographic database 113 which stores the geofences or designated geographic areas for creating the evaluation and/or training datasets. In one embodiment, the geographic database 113 can also include representations of mapped geographic features to facilitate visual odometry to increase localization accuracy. In one embodiment, the machine learning system 103 and/or computer vision system 105 have connectivity over a communication network 115 to the services platform 109 that provides one or more services 111. By way of example, the services 111 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 111 uses the output of the machine learning system 103 and/or of the computer vision system 105 employing skip areas for machine learning (e.g., detected lane features) to localize the vehicle 101 or a user equipment 117 (e.g., a portable navigation device, smartphone, portable computer, tablet, etc.) to provide services 111 such as navigation, mapping, other location-based services, etc.

In one embodiment, the machine learning system 103 and/or computer vision system 105 may be a platform with multiple interconnected components. The machine learning system 103 and/or computer vision system 105 may include multiple servers, intelligent networking devices, computing devices, components and corresponding software for providing parametric representations of lane lines. In addition, it is noted that the machine learning system 103 and/or computer vision system 105 may be a separate entity of the system 100, a part of the one or more services 111, a part of the services platform 109, or included within the UE 117 and/or vehicle 101.

In one embodiment, content providers 119a-119m (collectively referred to as content providers 119) may provide content or data (e.g., including geographic data, parametric representations of mapped features, etc.) to the geographic database 113, the machine learning system 103, the computer vision system 105, the services platform 109, the services 111, the UE 117, the vehicle 101, and/or an application 121 executing on the UE 117. The content provided may be any type of content, such as map content, textual content, audio content, video content, image content, etc. In one embodiment, the content providers 119 may provide content that may aid in the detecting and classifying of lane lines and/or other features in image data, and estimating the quality of the detected features. In one embodiment, the content providers 119 may also store content associated with the geographic database 113, machine learning system 103, computer vision system 105, services platform 109, services 111, UE 117, and/or vehicle 101. In another embodiment, the content providers 119 may manage access to a central repository of data, and offer a consistent, standard interface to data, such as a repository of the geographic database 113.

In one embodiment, the UE 117 and/or vehicle 101 may execute a software application 121 to capture image data or other observation data for inclusion in location-aware training and/or evaluation datasets according the embodiments described herein. By way of example, the application 121 may also be any type of application that is executable on the UE 117 and/or vehicle 101, such as autonomous driving applications, mapping applications, location-based service applications, navigation applications, content provisioning services, camera/imaging application, media player applications, social networking applications, calendar applications, and the like. In one embodiment, the application 121 may act as a client for the machine learning system 103 and/or computer vision system 105 and perform one or more functions associated with providing a location-aware evaluation of a machine learning model alone or in combination with the machine learning system 103.

By way of example, the UE 117 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 117 can support any type of interface to the user (such as "wearable" circuitry, etc.). In one embodiment, the UE 117 may be associated with the vehicle 101 or be a component part of the vehicle 101.

In one embodiment, the UE 117 and/or vehicle 101 are configured with various sensors for generating or collecting environmental image data (e.g., for processing by the machine learning system 103 and/or computer vision system 105), related geographic data, etc. In one embodiment, the sensed data represent sensor data associated with a geographic location or coordinates at which the sensor data was collected. In this way, the sensor data can act as observation data that can be separated into location-aware training and evaluation datasets according to their data collection locations. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 117 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 117 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 117 and/or vehicle 101 may include GPS or other satellite-based receivers to obtain geographic coordinates from satellites 123 for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 115 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the machine learning system 103, computer vision system 105, services platform 109, services 111, UE 117, vehicle 101, and/or content providers 119 communicate with each other and other components of the system 100 using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 6:
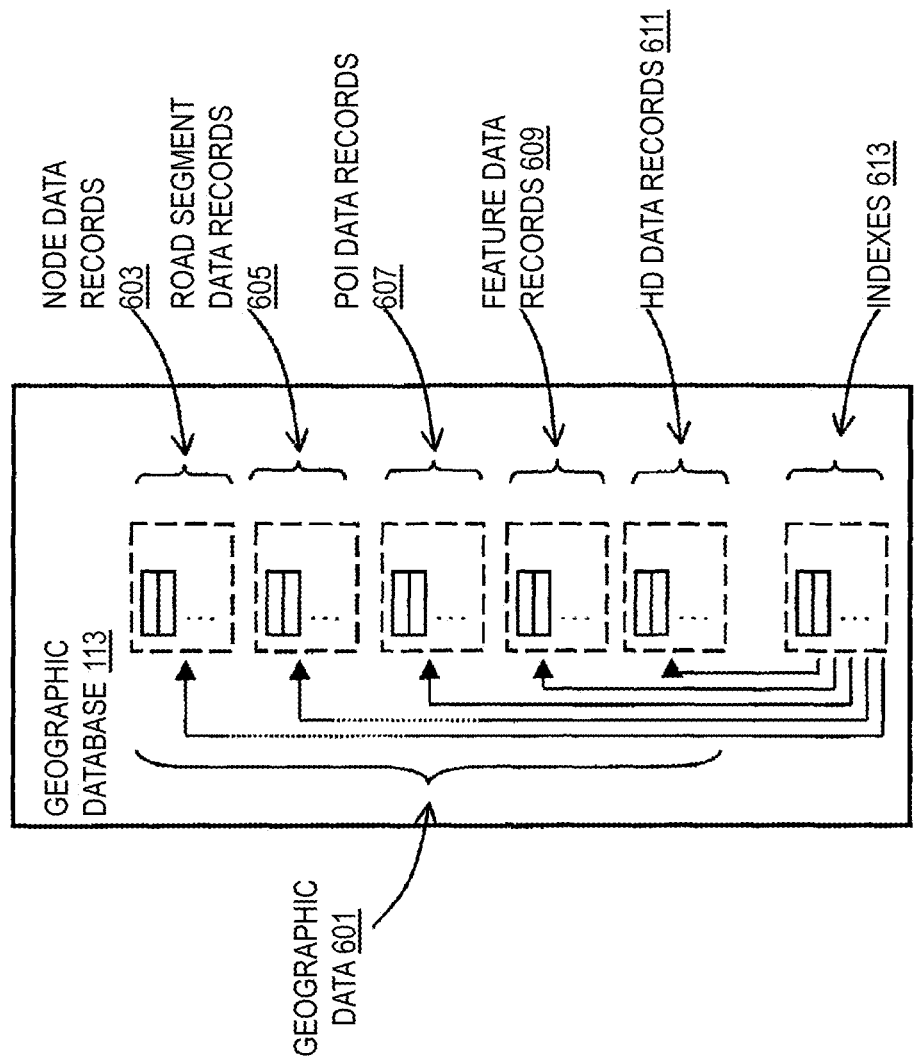
FIG. 6 is a diagram of a geographic database, according to one embodiment.

FIG. 6 is a diagram of a geographic database, according to one embodiment. In one embodiment, the geographic database 113 includes geographic data 601 used for (or configured to be compiled to be used for) mapping and/or navigation-related services, such as for video odometry based on the mapped features (e.g., lane lines, road markings, signs, etc.). In one embodiment, the geographic database 113 includes high resolution or high definition (HD) mapping data that provide centimeter-level or better accuracy of map features. For example, the geographic database 113 can be based on Light Detection and Ranging (LiDAR) or equivalent technology to collect billions of 3D points and model road surfaces and other map features down to the number lanes and their widths. In one embodiment, the HD mapping data (e.g., HD data records 611) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 113.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 113 follows certain conventions. For example, links do not cross themselves and do not cross each other except at a node. Also, there are no duplicated shape points, nodes, or links. Two links that connect each other have a common node. In the geographic database 113, overlapping geographic features are represented by overlapping polygons. When polygons overlap, the boundary of one polygon crosses the boundary of the other polygon. In the geographic database 113, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 113 includes node data records 603, road segment or link data records 605, POI data records 607, machine learning data records 609, HD mapping data records 611, and indexes 613, for example. More, fewer or different data records can be provided. In one embodiment, additional data records (not shown) can include cartographic ("carto") data records, routing data, and maneuver data. In one embodiment, the indexes 613 may improve the speed of data retrieval operations in the geographic database 113. In one embodiment, the indexes 613 may be used to quickly locate data without having to search every row in the geographic database 113 every time it is accessed. For example, in one embodiment, the indexes 613 can be a spatial index of the polygon points associated with stored feature polygons.

In exemplary embodiments, the road segment data records 605 are links or segments representing roads, streets, or paths, as can be used in the calculated route or recorded route information for determination of one or more personalized routes. The node data records 603 are end points corresponding to the respective links or segments of the road segment data records 605. The road link data records 605 and the node data records 603 represent a road network, such as used by vehicles, cars, and/or other entities. Alternatively, the geographic database 113 can contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 113 can include data about the POIs and their respective locations in the POI data records 607. The geographic database 113 can also include data about places, such as cities, towns, or other communities, and other geographic features, such as bodies of water, mountain ranges, etc. Such place or feature data can be part of the POI data records 607 or can be associated with POIs or POI data records 607 (such as a data point used for displaying or representing a position of a city).

In one embodiment, the geographic database 113 can also include machine learning data records 609 for storing the designated geographic areas or geofences for sampling training and evaluation datasets, as well as other related data used according to the various embodiments described herein. Alternatively, the designated geographic areas or geofences can be stored as metadata in the training database 107 in association the respective images of a machine learning training dataset. In addition, the machine learning data records 609 can also store training and evaluation data, machine learning models, annotated observations, computed featured distributions, sampling probabilities, and/or any other data generated or used by the system 100 according to the various embodiments described herein. By way of example, the machine learning data records 609 can be associated with one or more of the node records 603, road segment records 605, and/or POI data records 607 to support localization or visual odometry based on the features stored therein and the corresponding estimated quality of the features. In this way, the records 609 can also be associated with or used to classify the characteristics or metadata of the corresponding records 603, 605, and/or 607.

In one embodiment, as discussed above, the HD mapping data records 611 model road surfaces and other map features to centimeter-level or better accuracy. The HD mapping data records 611 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 611 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources).

In one embodiment, the HD mapping data records 611 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 611.

In one embodiment, the HD mapping data records 611 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 113 can be maintained by the content provider 119 in association with the services platform 109 (e.g., a map developer). The map developer can collect geographic data to generate and enhance the geographic database 113. There can be different ways used by the map developer to collect data. These ways can include obtaining data from other sources, such as municipalities or respective geographic authorities. In addition, the map developer can employ field personnel to travel by vehicle (e.g., vehicle 101 and/or UE 117) along roads throughout the geographic region to observe features and/or record information about them, for example. Also, remote sensing, such as aerial or satellite photography, can be used.

The geographic database 113 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 117, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing a location-aware evaluation of a machine learning model may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
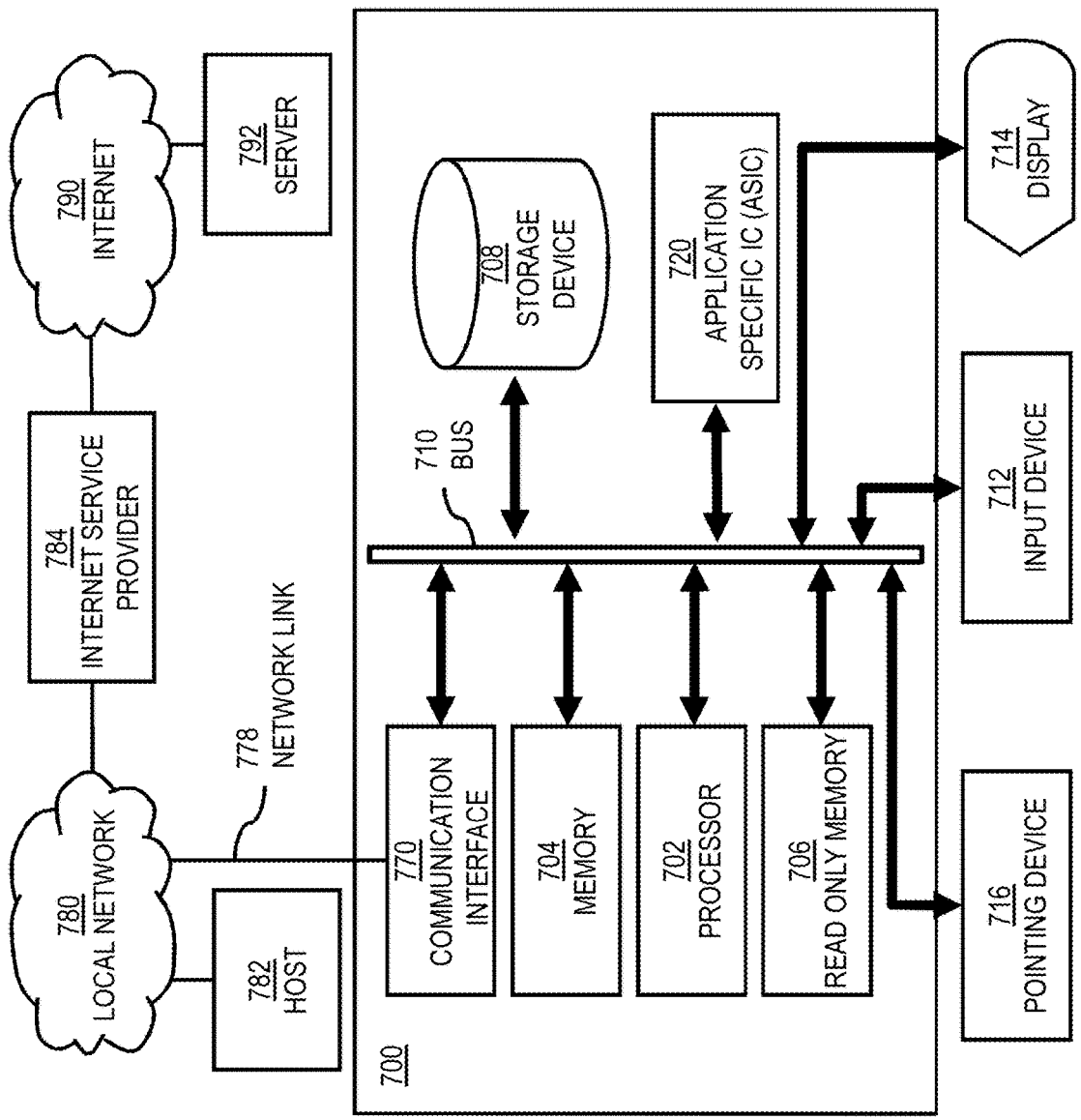
FIG. 7 is a diagram of hardware that can be used to implement an embodiment of the invention.

FIG. 7 illustrates a computer system 700 upon which an embodiment of the invention may be implemented. Computer system 700 is programmed (e.g., via computer program code or instructions) to provide a location-aware evaluation of a machine learning model as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to providing a location-aware evaluation of a machine learning model. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for providing a location-aware evaluation of a machine learning model. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing a location-aware evaluation of a machine learning model, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 115 for providing a location-aware evaluation of a machine learning model.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 8 illustrates a chip set 800 upon which an embodiment of the invention may be implemented. Chip set 800 is programmed to provide a location-aware evaluation of a machine learning model as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide a location-aware evaluation of a machine learning model. The memory 805 also stores the data associated with or generated by the execution of the inventive steps.

FIG. 9 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions that offer automatic contact matching. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile station 901 to provide a location-aware evaluation of a machine learning model. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 951 may be, but not limited to, a single memory, CD, DVD, ROM, RAM, EEPROM, optical storage, or any other non-volatile or non-transitory storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for providing a location-aware evaluation of a machine learning model comprising:
designating a geographic area for creating an evaluation dataset for the machine learning model; and
separating, by a processor, a plurality of observation data records into the evaluation dataset and a training dataset based on a comparison of a respective data collection location of each of the plurality of observation data records to the geographic area,
wherein the training dataset is used to train the machine learning model; and
wherein the evaluation dataset is used to evaluate the trained machine learning model.

2. The method of claim 1, wherein the plurality of observation data records is captured by one or more sensors of one or more probe devices.

3. The method of claim 1, wherein the plurality of observation data records includes one or more location-tagged images.

4. The method of claim 1, further comprising:
adding at least one record of the plurality of observation data records to the evaluation dataset based on determining that the respective data collection location is within the geographic area.

5. The method of claim 1, further comprising:
adding at least one record of the plurality of observation data records to the training dataset based on determining that the respective data collection location is not within the geographic area.

6. The method of claim 1, further comprising:
receiving another observation data record after creating the evaluation dataset, the training dataset, or a combination thereof; and expanding the evaluation dataset or the training dataset to include the another observation data record based on a comparison of another data collection location of the another observation data record to the geographic area.

7. The method of claim 1, wherein the geographic area is specified as a geo-fence.

8. The method of claim 1, wherein the geographic area is designated based on one or more map attributes.

9. The method of claim 8, wherein the geographic area is selected from one or more candidate geographic areas based on a diversity of the one or more map attributes.

10. The method of claim 1, wherein the one or more attributes include a functional class, a road elevation, a speed category, a presence or absence of road features, or a combination thereof.

11. An apparatus for providing a location-aware evaluation of a machine learning model comprising:
at least one processor; and
at least one memory including computer program code for one or more programs,
the at least one memory and the computer program code configured to, with the at least one processor, cause the apparatus to perform at least the following,
designating a geographic area for creating a training dataset for the machine learning model; and
separating a plurality of observation data records into the training dataset and an evaluation dataset based on a comparison of a respective data collection location of each of the plurality of observation data records to the geographic area,
wherein the training dataset is used to train the machine learning model; and
wherein the evaluation dataset is used to evaluate the trained machine learning model.

12. The apparatus of claim 11, wherein the apparatus is further caused to:
add at least one record of the plurality of observation data records to the training dataset based on determining that the respective data collection location is within the geographic area.

13. The apparatus of claim 11, wherein the apparatus is further caused to:
add at least one record of the plurality of observation data records to the evaluation dataset based on determining that the respective data collection location is not within the geographic area.

14. The apparatus of claim 11, wherein the apparatus is further caused to:
receive another observation data record after creating the training dataset, the evaluation dataset, or a combination thereof; and
expand the training dataset or the evaluation dataset to include the another observation data record based on a comparison of another data collection location of the another observation data record to the geographic area.

15. The apparatus of claim 11, wherein the geographic area is designated based on one or more map attributes.

16. A non-transitory computer-readable storage medium for providing a location-aware evaluation of a machine learning model, carrying one or more sequences of one or more instructions which, when executed by one or more processors, cause an apparatus to perform:
designating a geographic area for creating an evaluation dataset for the machine learning model; and
separating a plurality of observation data records into the evaluation dataset and a training dataset based on a comparison of a respective data collection location of each of the plurality of observation data records to the geographic area,
wherein the training dataset is used to train the machine learning model; and
wherein the evaluation dataset is used to evaluate the trained machine learning model.

17. The non-transitory computer-readable storage medium of claim 16, wherein the apparatus is further caused to perform:
adding at least one record of the plurality of observation data records to the evaluation dataset based on determining that the respective data collection location is within the geographic area.

18. The non-transitory computer-readable storage medium of claim 16, wherein the apparatus is further caused to perform:
adding at least one record of the plurality of observation data records to the training dataset based on determining that the respective data collection location is not within the geographic area.

19. The non-transitory computer-readable storage medium of claim 16, wherein the apparatus is further caused to perform:
receiving another observation data record after creating the training dataset, the evaluation dataset, or a combination thereof; and
expanding the training dataset or the evaluation dataset to include the another observation data record based on a comparison of another data collection location of the another observation data record to the geographic area.

20. The non-transitory computer-readable storage medium of claim 16, wherein the geographic area is designated based on one or more map attributes.

* * * * *